May 15, 1962
E. FRISCH ET AL
3,034,814
COUPLING
Filed July 22, 1957
4 Sheets-Sheet 1
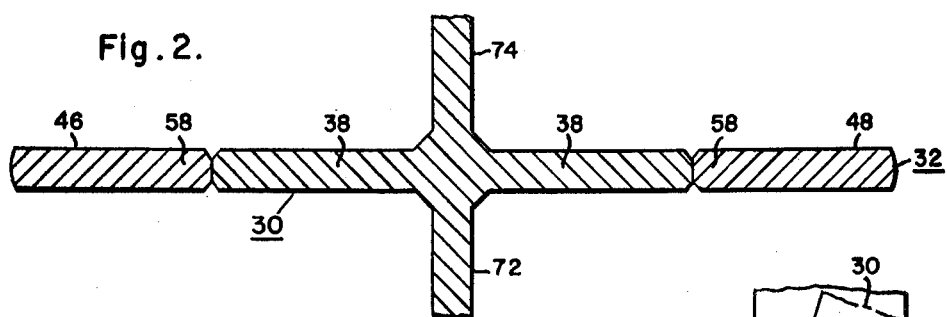
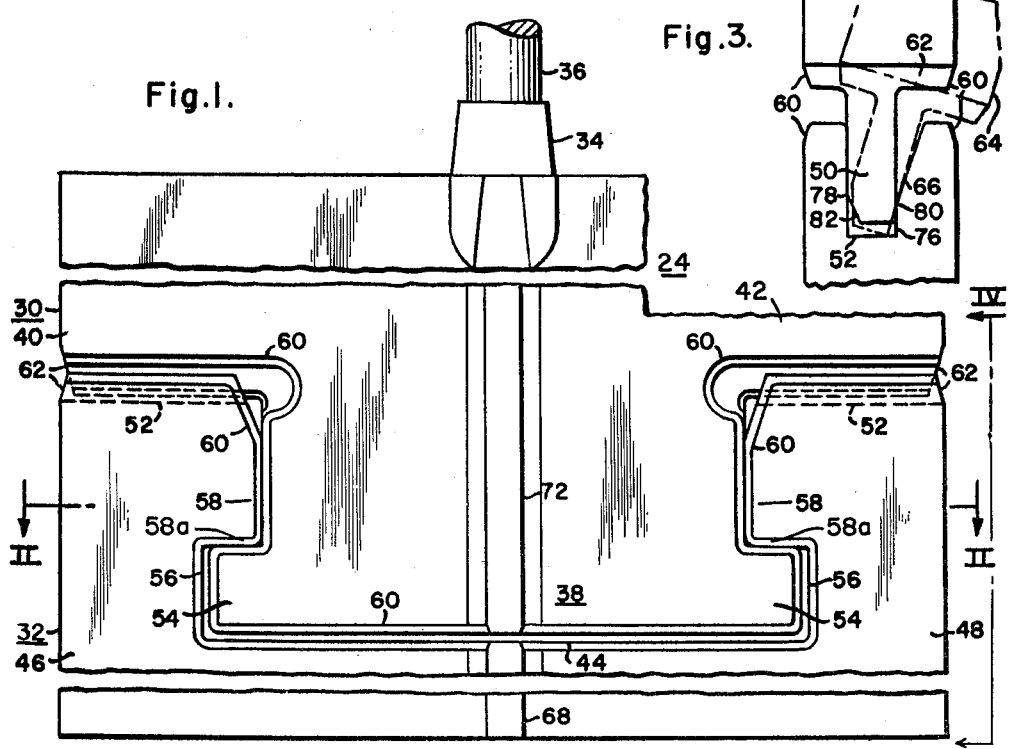
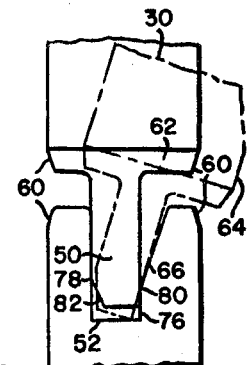
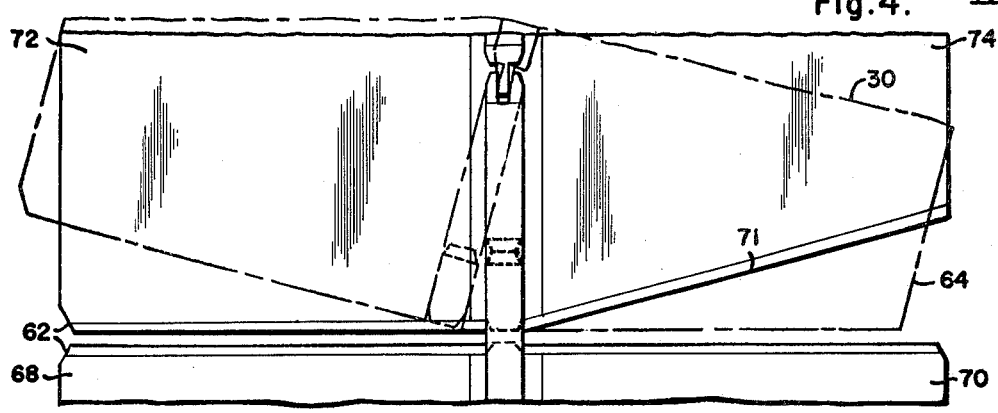

May 15, 1962  E. FRISCH ET AL  3,034,814
COUPLING

Filed July 22, 1957  4 Sheets-Sheet 3

United States Patent Office

3,034,814
Patented May 15, 1962

3,034,814
COUPLING
Erling Frisch and Carl G. Johnson, Pittsburgh, Pa., assignors, by mesne assignments, to the United States of America as represented by the United States Atomic Energy Commission
Filed July 22, 1957, Ser. No. 673,533
4 Claims. (Cl. 287—103)

This invention relates to a detachable coupling arrangement and, more particularly, to a coupling adapted for use in applications imposing severe space limitations.

The coupling of the character described is useful in these applications wherein the component parts to be joined are adapted for insertion into relatively narrow channels. More specifically, the invention is intended for use in detachably joining component parts in situations wherein the size of the coupling therefor is restricted by space limitations to the cross-sectional configuration of the parts to be joined. Accordingly, the coupling arrangement of the invention is adapted particularly for use with connecting rods, tie rods, long-handled tools, and the like, of considerable length, which are inserted into relatively closely fitting channels. Because of their great length, it is frequently desirable to fabricate such rod-like members or tools in two or more parts, to be joined in the aforesaid manner. In some applications, because of the distances involved and because of space limitations and the like, it is desirable to assemble and disassemble these parts more or less by remote manipulation.

Previously proposed coupling arrangements have been found inadequate in these applications because of their size and because of the relatively large number of components required for their operation. Moreover, such prior coupling arrangements frequently have been time-consuming relative to their coupling and decoupling operations, and have not been amenable for convenient, remote manipulation.

In view of the foregoing discussion, an object of the present invention is to provide a novel and efficient coupling arrangement adapted for use in applications imposing severe space limitations.

Another object of the invention is to provide a novel and efficient coupling arrangement adapted particularly for detachably joining rod-like members.

A further object of the invention is to provide a novel coupling arrangement adapted particularly for use in joining component parts of a member arranged for insertion into a closely fitting channel.

Still another object of the invention is to provide a coupling arrangement of the character described, the component parts of which can be readily and remotely engaged or disengaged.

Another object of the invention is to provide a coupling arrangement employing a minimum of component parts, and more specifically, an objective is to provide a coupling wherein the component parts thereof can be formed integrally, if desired, with the members being joined by the coupling.

Yet another object of the invention is to provide a coupling arrangement for rod-like members, the component parts of which arrangement are limited in size to the cross-sectional configuration of the members.

Another object of the invention is to provide a coupling arrangement adapted in one modification thereof for joining rod-like sections having a generally cruciform, cross-sectional configuration.

These and other objects, features and advantages of the invention will be made apparent during the ensuing description of illustrative modifications of the invention, with the description being taken in conjunction with the accompanying drawings, wherein:

FIG. 1 is a frontal view of one form of coupling arrangement according to the invention and shown here in conjunction with rod-like members of cruciform configuration;

FIG. 2 is a cross-sectional view of the coupling arrangement illustrated in FIG. 1, and taken along lines II—II thereof;

FIG. 3 is a side elevational view of the coupling arrangement illustrated in FIG. 1;

FIG. 4 is an enlarged side elevational view of the coupling arrangement of FIG. 1, taken along lines IV—IV thereof;

Figure 5:
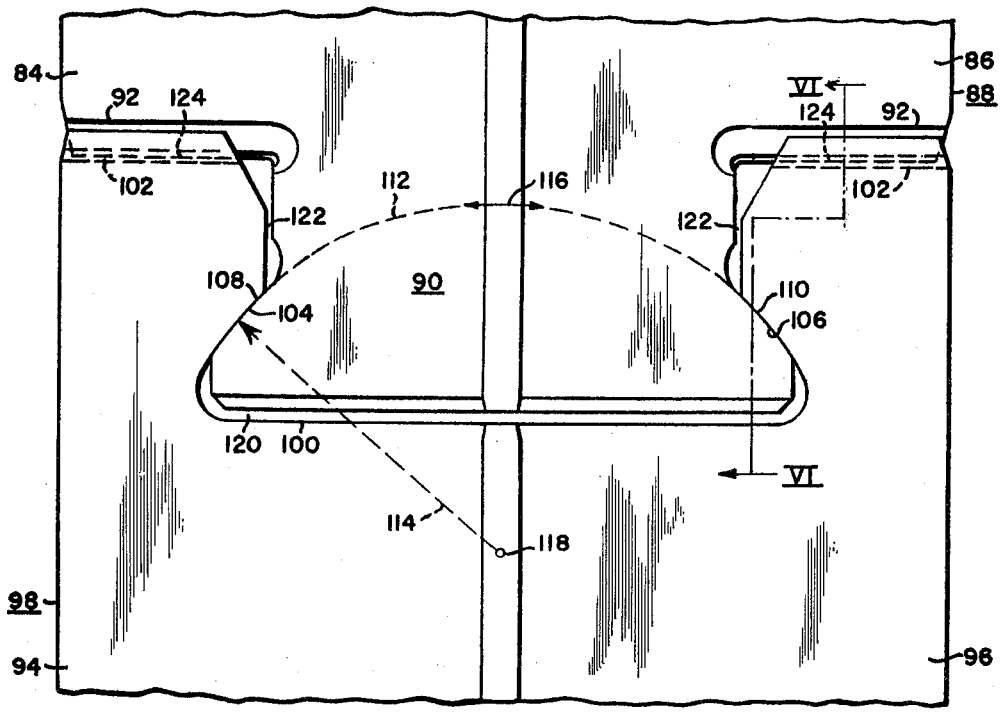
FIG. 5 is a frontal view of another illustrative form of the coupling arrangement according to the invention.

In accordance with the invention, a coupling arrangement is provided with key and keyhole formations respectively on the members to be coupled which can be formed, if desired, substantially integrally with the members being joined by the coupling. The coupling is further arranged such that the formations do not protrude beyond the exterior surfaces of the elements being joined by the coupling. Moreover the formations prevent the elements from becoming decoupled when the elements are maintained in alignment such as is the case when the aforementioned connecting rod or tie-rod assembly is inserted into a closely fitting channel therefor. On the other hand, the coupling of the invention is arranged for ready detachability when the coupled elements of the assembly are withdrawn from the aforesaid channel to the extent that the formations of the coupling arrangement proper are exposed and at least one of the members of the rod-like assembly can be disposed at a prescribed angularity to the other.

Referring now more particularly to FIG. 1 of the drawings, a rod-like assembly 24 includes two or more elongated component sections 30 and 32. The upper section 30 of the assembly is joined by a suitable coupling 34 to a linearly movable drive shaft 36 arranged for external manipulation of the assembly by any suitable means (not shown).

Referring now more specifically to FIGS. 1 and 4 of the drawings, there is shown one arrangement for detachably coupling the aforesaid sections 30 and 32 of the rod-like assembly without enlarging the cross-sectional configuration or size thereof. Although the coupling arrangement of the invention is shown in conjunction with detachably joining rod-like sections of cruciform configuration, it will be obvious that the invention is not limited thereto. In the arrangement of the invention presently under consideration, then, an inverted T-shaped projection or key formation 38 is imparted centrally and collectively to a pair of opposing arms 40 and 42 of the upper rod-like section 30. At the top of the lower rod-like section 32, a complementary shaped slot or keyhole formation 44 is formed in an adjacent pair of arms 46 and 48 with the slot thus formed having an inverted T configuration conforming to the projection 38 of the upper section 30.

Adjacent the bottom ends of the arms 40 and 42 of the upper section 30, as better shown in FIG. 3 of the drawings, a downwardly extending tongue 50 is formed as by milling. The tongues 50 are thus disposed at the base of the inverted T-shaped projection 38 and are adapted for insertion individually into a pair of generally V-shaped grooves 52 formed in the longitudinally outer portions of the overhanging portions 58 of the associated arms 46 and 48 of the lower section 32. Thus the V-shaped grooves 52 similarly are disposed at the base of the T-shaped slot 44 formed in the opposing arms 46 and 48 of the lower section 32, as aforesaid. The slots 52 are further arranged to receive the tongues 50 of the upper section 30 when the components of the coupling arrangement are assembled in accordance with the invention.

Before inserting the rod-like assembly 24 into its associated closely fitting channel (not shown), the components thereof including the upper and lower sections 30 and 32 are joined as illustrated in FIGS. 3 and 4 by inclining one of the components, for example the upper section 30 as indicated by the dashed lines of FIGS. 3 and 4. When thus positioned, the tongues 50 of the upper rod section 30 are positioned within the associated slots 52 of the lower section 32 in a manner more fully to be elaborated upon, and when thus positioned, the upper section 30 is moved into alignment with the adjacent lower section 32, whereupon the T-shaped projection 38 is positioned within the complementary T-shaped slot 44 of the section 32. In this position, protrusions 54 of the projection 38 are inserted into complementary indented portions 56 of the slot 44 with the result that the aforesaid protrusions are arranged for bearing contact with the overhanging portions 58 of the opposing arms 46 and 48 of the lower section 32, at the longitudinally inner surfaces of overhanging portions 58 as identified at 58a in FIG. 1.

Accordingly, when the upper and lower rod-like sections 30 and 32 are thus in alignment, the weight of the lower section 32 is borne by the protrusions 54 of the projection 38 of the upper section with the bottom portions of the slots 52 having been provided in sufficient depth to permit clearance in inserting protrusions 54 into their associated indented portions 56 of the slot 44. With this coupling arrangement, it is seen that the component parts thereof, viz., the T-shaped projection 38, its complementary slot 44, and the aforesaid tongue and groove arrangement, are of the same cross-sectional configuration as that of the associated upper and lower rod-like sections 30 and 32. Accordingly, the component parts of the rod assembly can be inserted through a closely fitting channel therefor, as aforesaid, inasmuch as no part of this coupling arrangement projects beyond the adjacent surfaces of the components, i.e., the upper and lower rod sections 30 and 32, thus joined.

In order to prevent those edges adjacent the slot 44, the projection 38, and the tongue and groove arrangements 50—52, from hanging up on any surface or projection which is proximate to or forms part of the aforesaid channel, these edges are desirably chamfered as indicated by the reference characters 60 (FIG. 1). In furtherance of the same purpose, the outward edges of each of the arms of the upper and lower rod sections 30 and 32 likewise are chamfered, adjacent the component parts of the coupling arrangement, as indicated by the reference characters 62.

Instead of forming the aforementioned component parts of the coupling arrangement integrally with the upper section 30 and the lower section 32, these components can be formed on a pair of tip portions having substantially the same cross-sectional configuration as that of the rod assembly. Thus, the T-shaped projection 38 can be formed upon a separate tip portion (not shown) which is then joined at the lower end of the upper section 30, as by welding or riveting, and the T-shaped slot 44 can likewise be formed in another separate tip (not shown) portion which can be joined to the upper extremity of the lower section 32 in a similar manner. These tip portions in one arrangement of the invention are formed from the same material as that of the rod section 32.

As is noted heretofore, in order to join the members, which are thus provided with components of the coupling arrangement, one of the members is tilted at an angle to the other as indicated by the dashed lines 64 of FIGS. 3 and 4, and when in this position, the tongues 50 of the tilted member, which in this case is the upper section 30, are inserted into the V-shaped grooves 52 of the other member, which in this case is the lower section 32. In order to permit such insertion when the upper section 30 and its extension are in this relative position, a wall surface 66 of each groove 52 is disposed at an angle to the longitudinal axis of the lower section 32, that is to say, to the longitudinal axis of the rod assembly 24 when disposed in its operative position. The inclination of the wall surface 66 desirably is slightly greater than the inclination to which the upper section 30 must be tilted in order to provide an initial lateral clearance between the protrusions 54 of the projection 38 and the overhanging portions 58 adjacent the lower section slot 44, as better shown in FIG. 4 of the drawings. In the case of a rod assembly of cruciform cross-sectional configuration, such as that illustrated in the drawings, it is desirable to terminate at positions proximate to the bottom edge of the slot 44, those lower rod section arms 68 and 70 which are perpendicularly disposed relative to the arms 46 and 48 thereof in which the slot 44 is formed. In order to permit the aforesaid inclination of one of the sections 30 or 32, the leading or lower edge 71 of one of arms 72 or 74 of the upper section 30 is inclined upwardly. In this example, these arms 72 and 74 of the upper section likewise are disposed perpendicularly to its opposing arms 42 and 44 upon which the T-shaped projection 38 is formed and are arranged with their lower extremities lying adjacent the upper extremities of the lower section arms 68 and 70.

After the elements to which the components of the coupling arrangement are applied as aforesaid, are joined and then moved to their aligned position, as indicated by the solid lines of FIGS. 3 and 4, lateral play between these components is substantially prevented by providing each of the grooves 52 with a relatively short vertical wall portion 76 disposed adjacent the bottom of the groove and joining the inclined wall surface 66 thereof. This vertical wall portion 76 is so spaced from the opposing vertical wall portion 78 of each groove 52, with the result that a relatively close fit of the slot 52 with the associated tongue 50 is afforded, when the latter is disposed in its aligned position. This fit between the bottom portion of the groove 52 and the tongue 50 when the upper section 30 and the lower section 32 are aligned operates to minimize or prevent altogether any lateral play between these elements, which otherwise may permit adjacent portions of the rod assembly to hang up on projection portions in its aforesaid channel, as the assembly is moved relative thereto.

To facilitate decoupling the coupling arrangement, illustrated in FIGS. 1 to 4, each of the tongues 50 is formed with an inclined surface 82 adjacent the lower edge thereof so that the tongue portion can be rotated when the upper rod section 30 is tilted or inclined, relative to the slot 52 and about the junction 80 between the inclined wall surface 66 and the adjacent vertical wall portion 76 of the aforesaid slot, without causing a lower edge portion of the tongue frictionally to engage the opposing vertical wall 78 of the associated slot 52.

Figure 6:
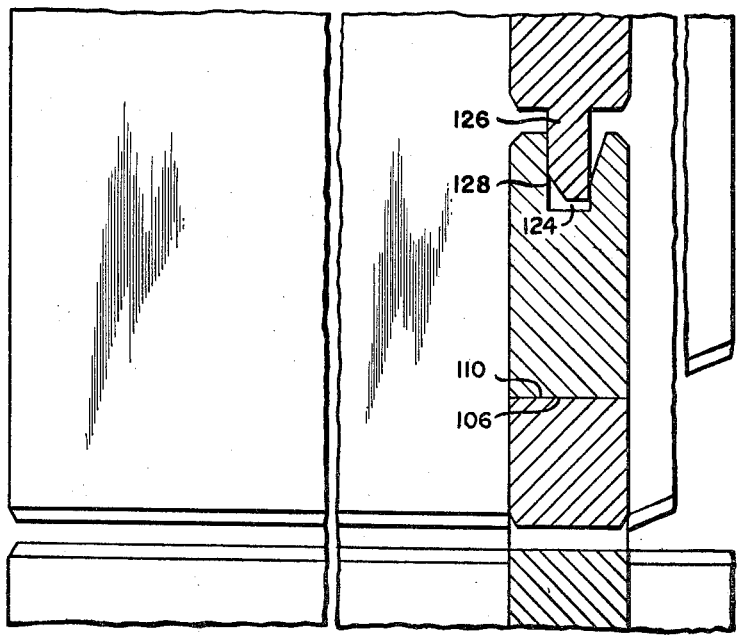
FIG. 6 is a longitudinal sectional view of the coupling arrangement of FIG. 5, taken along the line VI—VI thereof.

In FIGS. 5 and 6 of the drawings, another form of the coupling arrangement invention is depicted. In this latter application of the invention, a pair of opposing arms 84 and 86 of an upper rod section 88 are provided with an inverted generally T-shaped projection or key formation 90 and with downwardly extending tongue portions 92, in a manner similar to that described heretofore in connection with FIGS. 1 to 4. In a similar manner, an opposing pair of arms 94 and 96 of a lower rod section 98 are provided with a complementary slot or keyhole formation 100 and with generally V-shaped grooves 102. This latter mentioned tongue and groove arrangement is similar to that discussed in FIGS. 1 to 4 of the drawings and accordingly need not be further elaborated upon.

In the arrangement of the invention presently under consideration, means are provided for permitting slight axial misalignments of the upper section 88 relative to the lower section 98 in any direction thereof, but particularly in a direction substantially parallel to the plane of the projection 90, as occasioned by deviations from linearity of the upper section 88, the lower section 98, their associated channel, and the like. Although it will be readily apparent that the first-mentioned form of the invention (FIGS. 1 to 4) can accommodate similar slight misalignments, it is contemplated that the coupling arrangement of FIGS. 5 and 6 can be misaligned to a limited extent as aforesaid without materially shifting or redistributing the weight of the lower section 98, which weight is borne by the bearing surfaces 104—108 and 106—110, presently to be described. More specifically, this latter feature of the invention is employed to ensure maintenance of a given weight distribution, when the rod assembly is employed in vertical disposition as shown, throughout the component parts of the coupling arrangement, and accordingly, less structural strength is required in order to meet all operating contingencies to which the rod assembly may be subjected.

One arrangement for maintaining the aforesaid weight distribution of the lower rod section 98 comprises the imposition of an arcuate configuration to bearing surfaces 104 and 106 of the T-shaped projection 90. A complementary arcuate configuration is likewise imparted to bearing edges 108 and 110 of the slot 100 formed in the lower section 98 and engaging respectively the aforesaid bearing surfaces 104 and 106. Each pair of mating bearing surfaces 104—108 and 106—110 are further arranged to conform to an arc 112 of a circle whose center desirably lies upon the longitudinal axis of the lower section 98. The radius 114 of the circular arc 112 is selected of such length that the angular disposition of the aforesaid mating surfaces relative to the longitudinal axis of the upper section 88 and the lower section 98 is such as to induce slippage at the engaged bearing surfaces thereof when either the upper section or the lower section is inclined in a direction parallel to the plane of the projection 90. Another factor determining the length of the radius 114 is the avoidance of wedging action between the bearing surfaces 104 and 106 of the projection 90 and the bearing edges 108 and 110, respectively, of the slot 100 which would occur if the aforesaid mating surfaces are disposed at too great an inclination thereof to the horizontal.

With this latter arrangement then, any slight misalignment or tilting in either direction of the upper section 88, generally in the plane indicated by arrow 116, will be accommodated by slippage between the pairs of mating surfaces 104—108 and 106—110, inasmuch as the aforesaid misalignment will be pivoted about the center 118 of the circular arc portion 112. Similarly any slight misalignment in this plane of the lower section 98 will also be expressed as rotation about the aforesaid center 118. Such misalignments will induce slippage between the aforesaid mating surfaces, and accordingly, the weight distribution between each pair of surfaces will remain substantially unchanged. In order to accommodate these slight misalignments, a space or gap 120 is provided between the lower extremity of the projection 90 and the bottom edge of the slot 100, and like spaces 122 and 124 are provided between the adjacent vertical edges of the slot 100 and of the projection 90 and between tongues 126 and grooves 128, respectively, with the latter spacings 124 being better shown in FIG. 6 of the drawings.

Figure 10:
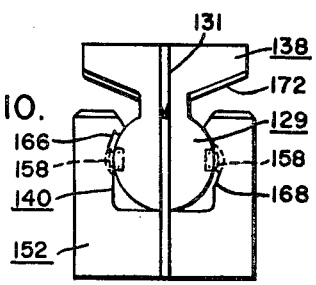
FIG. 10 is a reduced elevational view showing the coupling arrangement of FIG. 7 in its coupled or operative position.

It will be appreciated that, alternatively, the projection 90 can be replaced by a single discoidal projection such as that shown in FIG. 10, with the slot 100 being rearranged to accommodate the latter projection. By making the latter projection substantially circular and by disposing its center upon the longitudinal axis of the assembly a similar result will be obtained in the event of an operating misalignment as aforesaid.

Turning now to FIGS. 7 to 11 of the drawings, another illustrative form of the invention is disclosed therein which is more particularly adapted for use with a rod assembly of cruciform cross section. This latter form of invention, although operative upon principles similar to those described heretofore, is adaptable for those applications wherein additional bearing surfaces are required due to added load or to vertical disposition of the assembly, or both. In this arrangement of the invention, a key formation or projection 129 or 131 of discoidal configuration is imparted, respectively, to each pair of opposing arms 130—132 and 134—136 of an upper rod section 138. The aforesaid discoidal projections 129 and 131 are each adapted to seat within respective, complementary keyhole formations or slots 140 and 142 formed, respectively, in opposing pairs of arms 144—146 and 148—150 of a lower rod section 152. As better shown in FIGS. 7 and 11 of the drawings, the edges of the slots 140 and 142 adjacent the openings thereof are inclined inwardly as indicated by the reference character 154 in order to afford bearing contact with portions of the discoidal projections 129 and 131 when the upper section 138 is aligned with the lower section 152.

Figure 7:
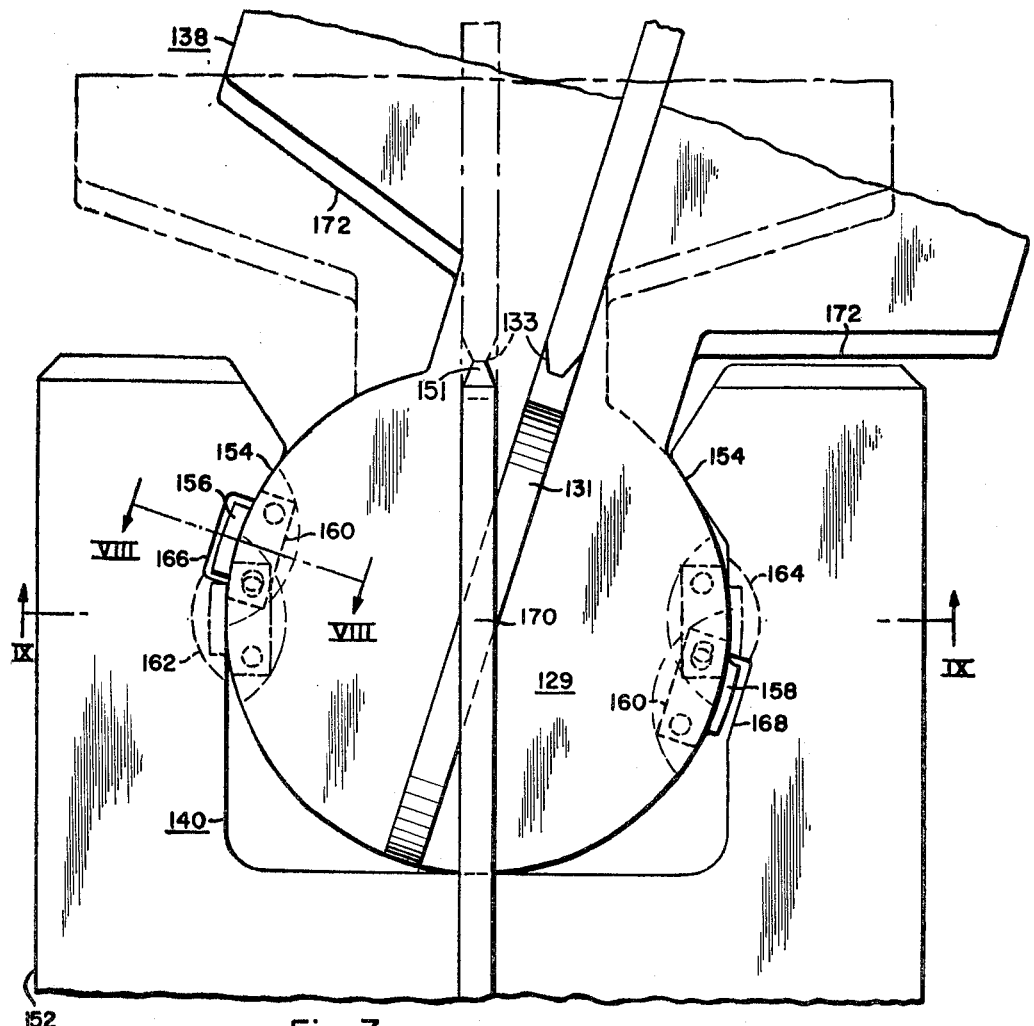
FIG. 7 is a frontal view of still another exemplary form of the coupling arrangement of the invention.
Figure 8:
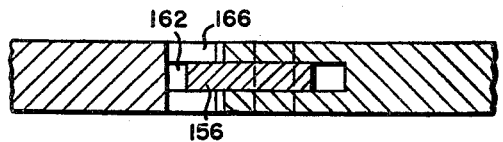
FIG. 8 is a partial sectional view of the coupling arrangement of FIG. 7, taken along reference lines VIII—VIII thereof.

In this example of the invention, in order to maintain the aforesaid alignment of the upper and lower sections 138 and 152, a tongue and groove arrangement is associated with one of the discoidal projections 129 or 131 and its associated slot 140 or 142, respectively, in order to prevent lateral displacement of the discoidal projections relative to the slots 140 and 142 when the assembly is in its aligned and operating position. One form of such tongue and groove arrangement includes a pair of tongue members 156 and 158 secured at diametrically opposed positions on the periphery of the discoidal projection 129. These tongue portions can be formed integrally with the discoidal projection, or alternatively, as illustrated in FIGS. 7 and 8 of the drawings, may be provided in the form of inserts which are partially inserted into a pair of similarly disposed recesses 160 formed and similarly disposed in the projection 129 and secured therein, as by riveting. When thus positioned, the tabs 156 and 158 are arranged for insertion when in the aligned position of the control rod sections 138 and 152, into a pair of grooves 162 and 164 formed in opposing portions of the associated slot 140.

Figure 9:
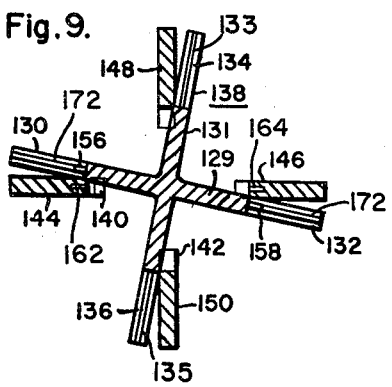
FIG. 9 is a reduced cross-sectional view of the coupling arrangement of FIG. 7, taken generally along reference lines IX—IX thereof and having the members shown therein rotated to a position for initiating the coupling thereof.

When coupling the exemplary arrangement of the invention as illustrated in FIGS. 7 to 11 of the drawings, the upper section 138 is rotated slightly about its longitudinal axis as shown in FIG. 9 of the drawings, such that the periphery of the discoidal projections 129 and 131 will clear the bearing edges 154 of the associated slots 140 and 142. The upper section 138 in its thus rotated position then is inclined at an angle to the lower rod section 152.

When thus inclined, the upper section 138 is rotated in the reverse direction again about its longitudinal axis to bring the discoidal projections 129 and 131 into the planes of the associated slots 140 and 142, respectively. In order to permit this last operation to be effected, a pair of suitably disposed (indents) 166 and 168 are formed in opposing sides of the slot 140 to provide clearance for the tabs 156 and 158, respectively, when the discoidal projection 129 is rotated as aforesaid to the plane of its associated slot 140. The aforesaid indents are disposed adjacent to and in communication with the grooves 162 and 164 so that upon straightening the upper rod section 138 to its longitudinally aligned position relative to the lower section 152, the tabs 156 and 158 will be inserted respectively into their associated grooves 162 and 164. A suitable stop (not shown) can be provided adjacent one or both of the indents 166 and 168 to align tabs 156 and 158 with the grooves 162 and 164 before the upper rod section is straightened.

Figure 11:
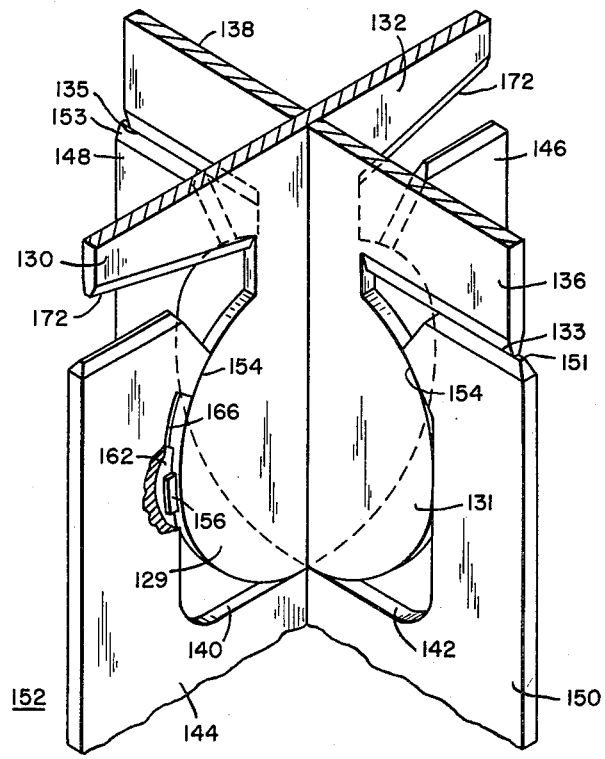
FIG. 11 is a perspective view of the coupling arrangement of FIG. 7 in its coupled or operative position.

As better shown in FIGS. 8 and 11 of the drawings, the tabs 156 and 158 fit relatively closely within their associated slots in order to minimize rotational movement of the projections 129 and 131 relative to their associated slots 140 and 142 when the upper rod section 138 and the adjacent lower section 152 are aligned, as shown in FIGS. 10 and 11 of the drawings. In order to permit inclination of the upper section 138 about the center 170 of its discoidal projection 129, for purposes of joining the coupling components, the tapered downward or leading edge 172 of one or both of the opposed upper section arms 130 and 132 is inclined upwardly in order to provide the necessary clearance. It will be obvious that any slight misalignment in any direction of the upper rod section 138 and the lower section 152 will occur in the form of rotation about the center of discoidal projections 129 and 131 and accordingly, the weight of the lower section 152 borne thereby will not be materially shifted relative to the individual bearing portions of the discoidal projections.

The downward edges of the arms 136 and 138 are tapered at 133 and 135, respectively, and are not inclined as are the edges 172. Rather, the edges 136 and 138 are disposed to engage the opposed tapered upper surfaces 151 and 153 of the arms 150 and 148 (FIG. 11) so that stability of the coupling is increased when in the engaged position.

As seen in FIG. 7, when the members 138 and 152 are misaligned, the edges 133 and 135 are pivotally moved away from the surfaces 151 and 153, respectively.

From the foregoing, it will be apparent that novel and efficient forms of the coupling arrangement have been disclosed herein. As noted heretofore, each of these aforedescribed forms are particularly adapted for use in those applications subject to rather severe space limitations and yet wherein simplicity and a minimum number of component parts are important, such as in the case of rod assemblies employed as connecting or tie members and movably inserted within closely fitting channels. In such applications, the coupling arrangements of the invention in their simplicity are readily adaptable for remote manipulation, if desired, to effect coupling and decoupling thereof. The aforesaid exemplary modifications of the invention have been presented for purposes of illustrating and describing the invention and are not to be considered as limitative thereof.

Therefore, numerous modifications of the invention exemplified herein will occur to those schooled in the art without departing from the spirit and scope of the invention. Moreover, it is to be understood that certain features thereof can be employed without a corresponding use of other features.

What is claimed as new is:

1. An arrangement for coupling a pair of elements at opposed ends thereof said arrangement comprising complementary coplanar key and keyhole like formations in the respective elements, said keyhole formation being formed between two opposing arms at the longitudinally outward end of the first of said elements and having at least one overhanging portion on one of said arms extending in a transverse direction toward the other arm with an indented portion longitudinally inward of said overhanging portion, said key formation in the second element being of complementary shape to said keyhole formation and having a transversely extending protrusion for bearing contact with the longitudinally inner surface of said overhanging portion, said second element having a portion at the base of said key formation which overlies the longitudinally outer portion of said overhanging portion, said overlying portion, and said longitudinally outer portion of said overhanging portion being tongue and groove formations having their cooperating contiguous surfaces projecting generally in said longitudinal direction and extending in said transverse direction with the mouth of said groove being relieved to allow initial insertion of said tongue in said groove when one of said elements is tilted with respect to said other element.

2. The coupling arrangement of claim 1 wherein said elements have a generally cruciform cross-sectional configuration, with one of the arms transverse to said key and keyhole formations being relieved to allow said initial insertion when one of said elements is tilted with respect to said other element.

3. The coupling arrangement of claim 1 wherein said keyhole formation is characterized by an overhanging portion extending from each of said opposing arms.

4. The coupling arrangement of claim 3 wherein said transversely extending protrusions and said inner surface of said overhanging portions with which said protrusions make bearing contact conform to portions of a circle whose center lies upon the longitudinal axis of said elements.

References Cited in the file of this patent
UNITED STATES PATENTS

| | | |
|---|---|---|
| 278,028 | Lobdell | May 22, 1883 |
| 594,043 | Thompson | Nov. 23, 1897 |
| 715,976 | Carolan | Dec. 16, 1902 |
| 826,707 | Brent | July 24, 1906 |
| 1,250,509 | Rigby | Dec. 18, 1917 |
| 1,598,293 | Luck | Aug. 31, 1926 |
| 1,736,373 | Seegar | Nov. 19, 1929 |
| 1,922,564 | Wright | Aug. 15, 1933 |
| 1,932,436 | Barnhill | Oct. 31, 1933 |
| 2,186,763 | McMackin | Jan. 9, 1940 |